United States Patent [19]

Koyokawa et al.

[11] Patent Number: 4,716,349

[45] Date of Patent: Dec. 29, 1987

[54] NUMERICAL CONTROL APPARATUS

[75] Inventors: Morio Koyokawa; Akihiko Fujimoto, both of Aichi, Japan

[73] Assignee: Mitsubishi Denki Kabushiki Kaisha, Tokyo, Japan

[21] Appl. No.: 645,959

[22] Filed: Aug. 31, 1984

[30] Foreign Application Priority Data

Sep. 1, 1983 [JP] Japan .................................. 58-160665

[51] Int. Cl.$^4$ ............................................. G05B 11/32
[52] U.S. Cl. .................................... 318/562; 364/171; 364/188
[58] Field of Search ............... 318/567, 569, 570, 562; 364/747, 188, 171, 189

[56] References Cited

U.S. PATENT DOCUMENTS

| | | | |
|---|---|---|---|
| 3,400,677 | 9/1968 | Bowers et al. .................. | 318/567 X |
| 3,585,480 | 6/1971 | Kirkpatrick ........................ | 318/569 |
| 3,641,326 | 2/1972 | Harte ................................ | 318/562 X |
| 3,970,830 | 7/1976 | White ............................... | 318/567 X |
| 4,150,427 | 4/1979 | Slawson .......................... | 318/570 X |
| 4,288,849 | 9/1981 | Yoshida et al. ................. | 318/562 X |
| 4,314,330 | 2/1982 | Slawson .......................... | 318/570 X |
| 4,384,332 | 5/1983 | McMurty ......................... | 318/570 X |
| 4,607,327 | 8/1986 | Kishi et al. ......................... | 364/188 |

Primary Examiner—Benjamin Dobeck
Attorney, Agent, or Firm—Sughrue, Mion, Zinn, Macpeak & Seas

[57] ABSTRACT

An NC apparatus in which a single interface is used in common with both an NC operation board and a machine operation board to thereby reduce the apparatus in size and the interfaces in number. A run code generator is provided on the machine operation board, which is removably connected with the interface, for putting the controlling program, which is the high-level language program, into the run state. The interface is a serial interface, preferably an RS-232 type interface.

8 Claims, 8 Drawing Figures

NUMERICAL CONTROL APPARATUS

BACKGROUND OF THE INVENTION

The present invention relates to an NC (Numerical Control) apparatus, and more particularly to an NC apparatus in which the number of interfaces is reduced and in which the size of the apparatus is made small.

FIG. 1 is a schematic diagram showing an example of a conventional NC apparatus. In this drawing, reference numerals 10 and 20 designate an NC apparatus and a machine which is an object to be controlled. The NC apparatus 10 is composed of a body 11, an NC operation board 12, a machine operation board 13 and interfaces 14 and 15. The NC operation board 12 and the machine operation board 13 are connected with the body 11 through the interfaces 14 and 15, respectively. The machine 20 is connected to the body 11 through an interface 16.

FIG. 2 is a block diagram showing the arrangement of the NC apparatus 10 of FIG. 1. In this drawings, the body 11 is composed of a control section 11A, an operation section 11B, a storage section 11C, an output section 11D, and a sequencer section 11E. The elements in the drawing are the same as FIG. 1.

The NC operation board 12 is connected with the body 11 through the interface 14. This connection is performed by means of an all-purpose serial data transmission system based on the RS-232C system defined by the ISO standard. FIG. 3 shows an example of the connection between an interface section 12A of the NC operation board 12 and the interface 14 of the body 11 according to the RS-232C system.

FIG. 4 shows the arrangement of the interface 15, which is composed of a parallel contact input/output circuit including an input circuit 15A and an output circuit 15B. The input circuit 15A receives a signal from an operation switch 131 of the machine operation board 13 by means of a receiver circuit 151 and transmits the signal to the body 11. The output circuit 15B includes a transistor TR which is driven by a signal from the body 11 and to produce an output signal. The output signal from the transistor TR actuates a relay 132 of the machine operation board 13 to light a lamp.

FIG. 5 shows an example of the machine operation board 13.

The operation of the apparatus will be described.

Necessary programs, data, etc. are entered through the NC operation board 12, and the apparatus is made ready to operate. Then, a start instruction is given through the machine operation board 13 and the machine 20 is controlled with the output from the output section 11D of the body 11. At the same time, the machine operation board 13 reads operating information from the sequencer section 11E of the body 11.

The machine operating information is composed of an operation switch input for causing the machine 20 to operate, an indicator lamp output for confirming the operating condition of the machine 20, etc. The operating switch input includes an NC mode signal switch input, an automatic start signal switch input, an automatic signal switch input, etc. The indicator lamp output includes an auto-start signal lamp output, an auto-stop signal lamp output, an alarm signal lamp output, etc. In this manner, inputting to the body 11 through the NC operation board 12 as well as operating through the machine operation board 13 are attained.

In the conventional NC apparatus, however, the body 11 is always connected with the NC operation board 12 and the machine operation board 13 so that there is a disadvantage that a wide space is required and respective interfaces are required for the boards 12 and 13.

SUMMARY OF THE INVENTION

The present invention has been attained to eliminate the disadvantages in the conventional NC apparatus. An object of the present invention is to provide an NC apparatus in which an interface is used commonly for an NC operation board and a machine operation board, whereby the apparatus is reduced in size and the interfaces can be reduced in number.

To attain the above-mentioned object, according to the present invention, an NC apparatus is provided in which a program is entered through an NC operation board using a high level language as a control language, and a machine, which is an object to be controlled, is controlled through a machine operation board, in which, according to the invention, the NC operation board is removably provided on an interface, a RUN code generator effects the running of the control language program of the numerical control apparatus, and the machine operation board is removably provided on the interface of the NC operation board.

DESCRIPTION OF THE PREFERRED EMBODIMENTS

Figure 6:
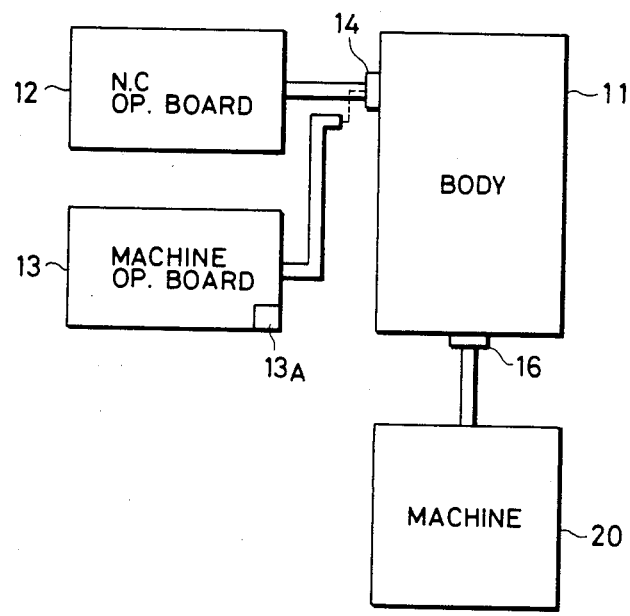
FIG. 6 is a schematic block diagram showing a preferred embodiment of the present invention.

FIG. 6 is a schematic diagram showing the arrangement of a preferred embodiment of the present invention. The apparatus of this embodiment differs from the conventional NC apparatus of FIG. 1 in that an NC operation board is removably provided on an interface, in that a RUN (operation start) code generating device effects the running of the control language program of the numerical control apparatus, and in that the machine operation board is removably provided on the interface of the NC operation board.

Figure 7:
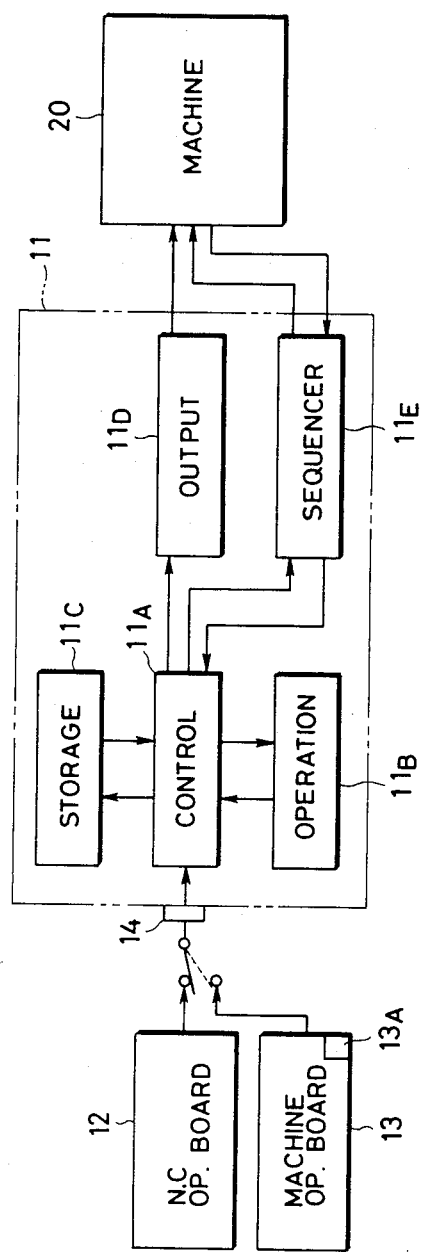
FIG. 7 is a block diagram showing the arrangement of the NC apparatus of the embodiment in FIG. 6.

FIG. 7 is a block diagram showing the arrangement of the NC apparatus 10 of the preferred embodiment of FIG. 6.

Figure 8:
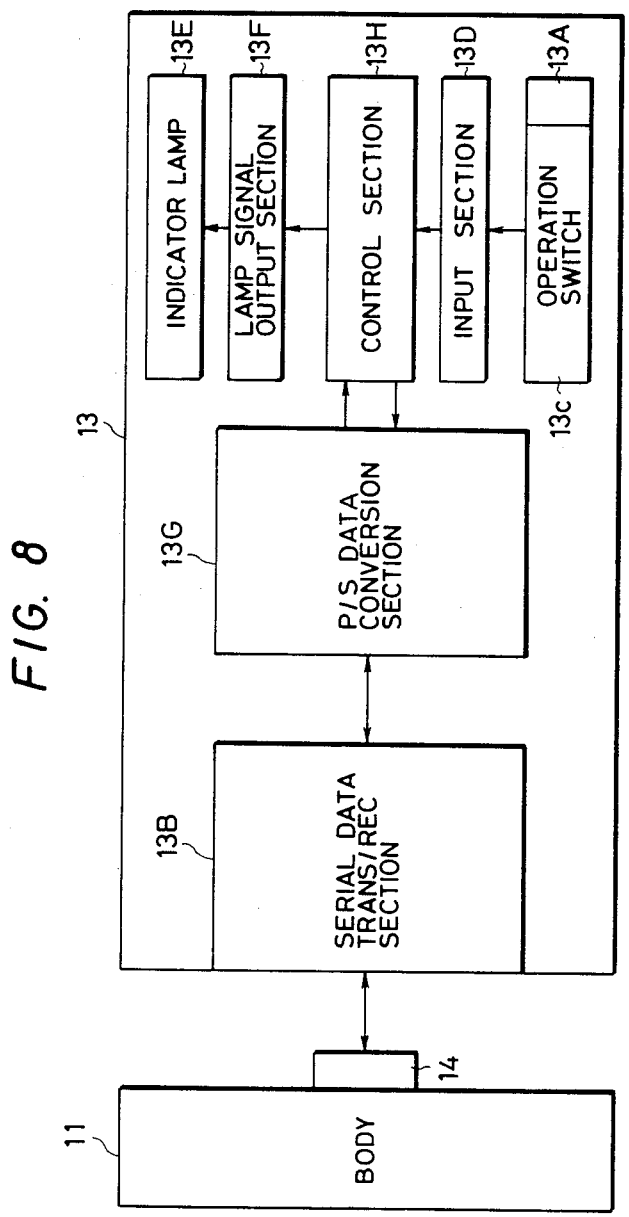
FIG. 8 is a block diagram showing the arrangement of the machine control board of the preferred embodiment.

FIG. 8 is a block diagram showing the arrangement of the machine operation board 13. To enable the machine operation board 13 to be connected with the interface 14, the machine operation board 13 is composed of a serial data transmitting receiving section 13B, an operation switch 13C, an operation switch signal input section 13D, an indicator lamp 13E, a lamp signal output section 13F, a parallel/serial data conversion section 13G, and a control section 13H.

The operation of the apparatus will be described.

Figure 1:
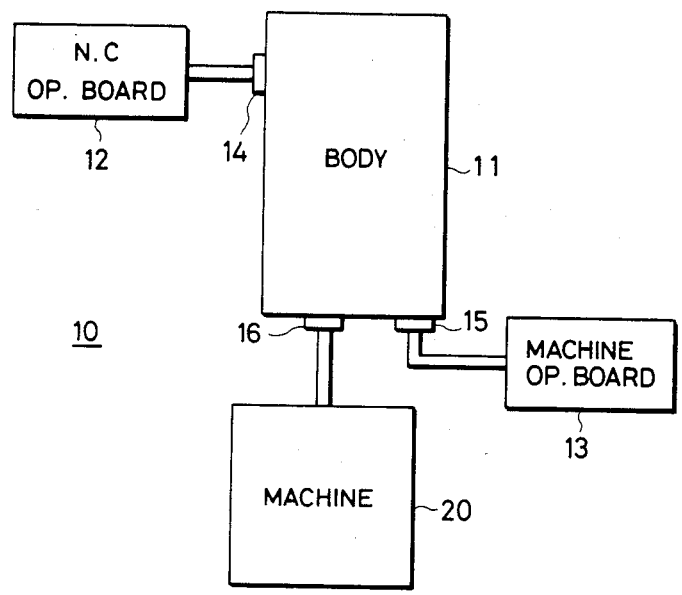
FIG. 1 is a schematic diagram showing an example of a conventional NC apparatus.
Figure 2:
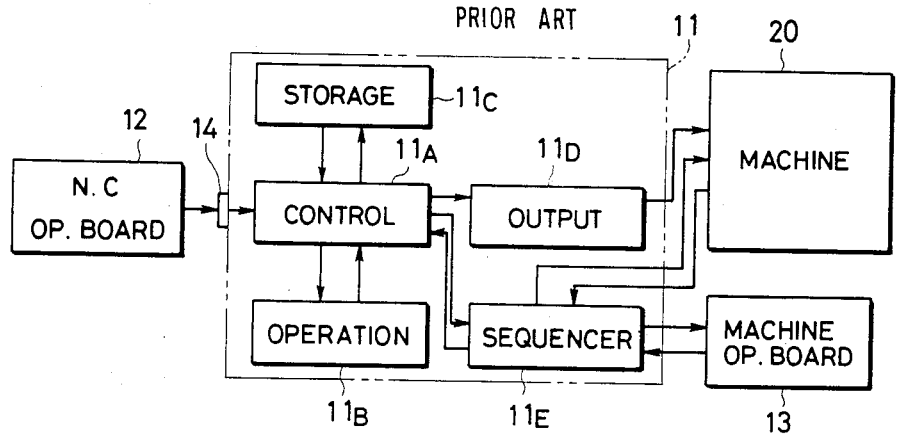
FIG. 2 is a block diagram showing the arrangement of the NC apparatus in FIG. 1.
Figure 3:
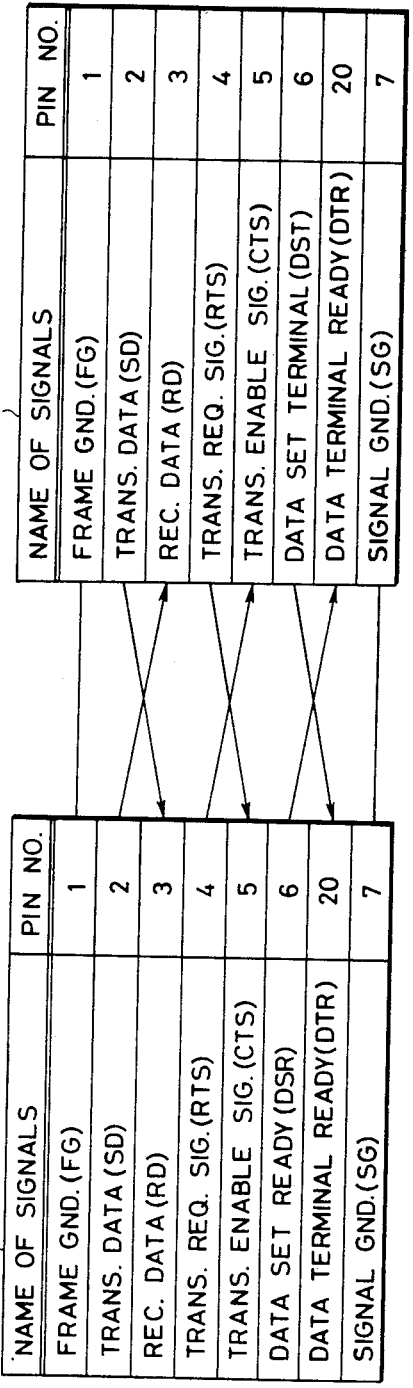
FIG. 3 is a diagram showing an example of the connection between an interface of body and an interface section of an NC operation board.
Figure 4:
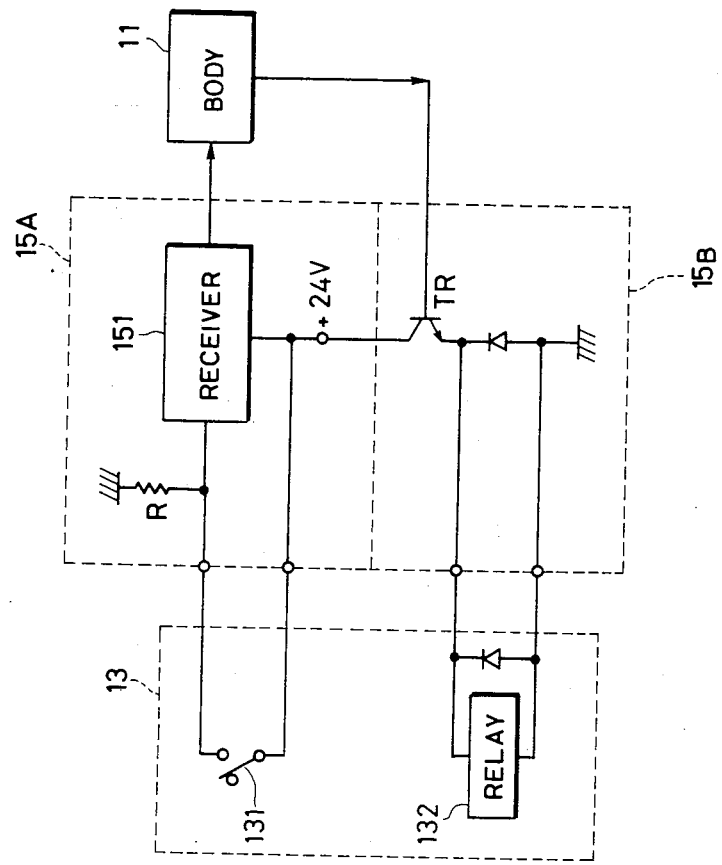
FIG. 4 is a circuit diagram showing an interface of a machine operation board.
Figure 5:
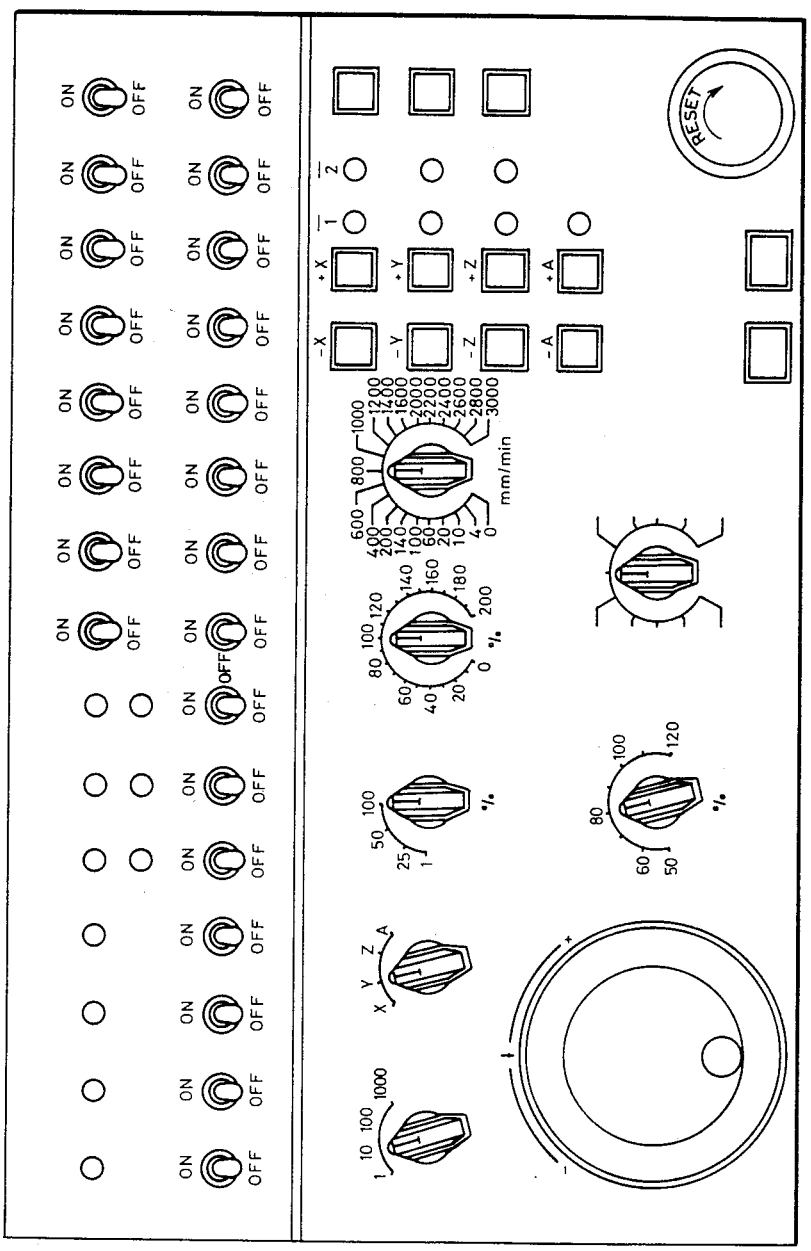
FIG. 5 is a diagram showing an example of the machine operation board.

First, initial preparation is made by connecting the NC operation board with the interface 14 and a necessary program, data, etc., are entered in the same way as in the conventional case of FIGS. 1 and 2.

Next, the NC operation board 12 is removed from the interface 14 and the machine operation board 13 is connected with the interface 14. Then, the RUN code generator 13A is actuated so as to effect the running of a program in a high level language such as BASIC or the like. Thereafter, it is possible to perform operations through the machine operation board 13.

The decision as to which one of the NC operation board 12 and the machine operation board 13 is connected with the interface 14 is made in accordance with a device indication code provided in each of the NC operation board 12 and the machine operation board 13. That is, in the case where either the NC operation board 12 or the machine operation board 13 is connected with the interface 14, or in the case where the body 11 is energized from a power source under the condition that either the board 12 or 13 has been connected with the interface 14, the body 11 identifies the board 12 and 13 by the device identification code provided on the boards 12 and 13.

To enable the machine operation board 13 to be connected with the interface 14, device identification function and machine operation board interface function are added to the storage section 11C of the body 11. The device identification function is used to sense which one of the boards 12 and 13 is connected with the interface 14 by means of the the device identification code. The machine operation board interface function includes a function to forward a switch signal from the switch 13C of the machine operation board 13 to the sequencer section 11E of the body 11 when the machine operation board 13 is connected with the interface 14, and a function to forward lamp output information generated in the sequencer section 11E to the machine operation board 13.

Moreover, the RUN code generator 13A, which has not been employed in the conventional apparatus, is newly added according to the present invention. The RUN code generator 13A includes an exclusive switch, etc. Upon operation of the exclusive switch, the program which has been entered with a high level language through the NC operation board 12 and stored in the storage section 11C of the body 11 is caused to run, the movement data of the machine 20 is manipulated, and operations such as data processing with respect to the man and machine interface of the boards 12 and 13 are started.

In the above mentioned embodiment, although the RUN code generator 13A is provided on the machine operation board 13, an alternative arrangement may be employed in which, for example, actuation is automatically effected upon the direction of the fact that the machine operation board 13 is connected with the interface 14. Further, a variety of switches may be used as the RUN code generator 13A. That is, an exclusive switch can be provided with which a RUN code is generated by operating the exclusive switch. Also, an auto-start switch, serving also as the RUN code generating switch, can be provided so that a RUN code is also generated upon actuation of the auto-start switch, etc.

As described above in detail, the NC apparatus according to the present invention is arranged such that an NC operating board is removably connected with an interface, a machine operating switch is removably connected with the interface, and a RUN code generator is provided. With this arrangement, the inventive apparatus is advantageous in that the interface can be used by the NC operation board as well as a machine operating board so that the apparatus can be constituted using only one interface. Also, since only one of the operation boards is connected with the body at one time, the apparatus can be reduced in size.

We claim:

1. An NC apparatus comprising;
 a body producing a signal for controlling a machine which is an object to be controlled;
 an NC operation board removably connected with a serial data interface of said body for inputting a controlling program, in which a high level language is used as a control language, to said body;
 a machine operation board removably connected with said interface for controlling said machine;
 run code generating means, provided on said machine operation board, for generating a run code signal in parallel form, said run code signal putting the controlling program inputted to said body into a run state; and
 a parallel to serial conversion means, provided on said machine operation board, for converting said run code to serial form whereby said run code can be entered into said body through said interface.

2. The numerical control apparatus according to claim 1, in which said run code generating means includes a manually operable switch means for generating a run code signal which places the controlling program into a run state.

3. The numerical control apparatus according to claim 2, in which said switch means further includes means for causing data processing operations to be started.

4. The numerical control apparatus according to claim 1, in which said body includes a storage section, a control section, an operation section, an output section, and a sequencer section.

5. The numerical control apparatus according to claim 4, in which said control section is connected with said interface.

6. The numerical control apparatus according to claim 4, in which said storage section stores at least a control program, a program of a device identification function, and a program of a machine operation board interface function.

7. An NC apparatus comprising:
 a body producing a signal for controlling a machine which is an object to be controlled;
 an NC operation board removably connected with an interface of said body for inputting a controlling program, in which a high level language is used as a control language, to said body;
 a machine operation board removably connected with said interface for controlling said machine; and
 run code generating means provided on said machine operation board for putting the controlling program inputted to said body into a run state;

wherein said machine operation board further comprises a serial data transmitting and receiving section, a parallel/serial data converting section connected with said serial data transmitter/receiver section, a control section connected with said parallel/serial data converting section, an operating switch connected with said control section through an operating switch signal input section, and an indicating lamp connected with said control section through a lamp signals output section.

8. The numerical control apparatus according to claim 7, in which said serial data transmitting/receiving section of said machine operation board is connected with said interface of said body.

* * * * *